United States Patent [19]
Purcell

[11] Patent Number: 5,862,374
[45] Date of Patent: Jan. 19, 1999

[54] SEARCH METHOD AND CIRCUIT

[75] Inventor: Roger Bixby Purcell, Weetangera, Australia

[73] Assignee: Megaword International Pty. Ltd., New South Wales, Australia

[21] Appl. No.: 838,714

[22] PCT Filed: Sep. 14, 1990

[86] PCT No.: PCT/AU90/00425

§ 371 Date: Apr. 17, 1992

§ 102(e) Date: Apr. 17, 1992

[87] PCT Pub. No.: WO91/04527

PCT Pub. Date: Apr. 4, 1991

[30] Foreign Application Priority Data

Sep. 14, 1989 [AU] Australia ............................ PJ6360/89

[51] Int. Cl.$^6$ .................................................. G06F 17/30
[52] U.S. Cl. .......................................... 395/606; 395/603
[58] Field of Search ............................ 364/419; 395/200, 395/600, 603, 606

[56] References Cited

U.S. PATENT DOCUMENTS

| | | | |
|---|---|---|---|
| 4,903,018 | 2/1990 | Wiebach et al. | 341/51 |
| 5,070,478 | 12/1991 | Abbott | 364/419 |
| 5,146,560 | 9/1992 | Goldberg et al. | 395/200 |
| 5,175,860 | 12/1992 | Yamada | 395/800 |
| 5,224,038 | 6/1993 | Bespalko | 364/419 |

*Primary Examiner*—Wayne Amsbury
*Attorney, Agent, or Firm*—Blakely Sokoloff Taylor & Zafman

[57] ABSTRACT

A method of searching a token stream for at least one predetermined token and a search circuit for performing the method. The token stream is read and an access address is formed using an accessed token read from stream. A memory is read using the access address, the memory having hit data stored therein at a location corresponding to the predetermined token. The reading steps are then repeated until the data is read indicating that the predetermined token has been found in the stream.

23 Claims, 13 Drawing Sheets

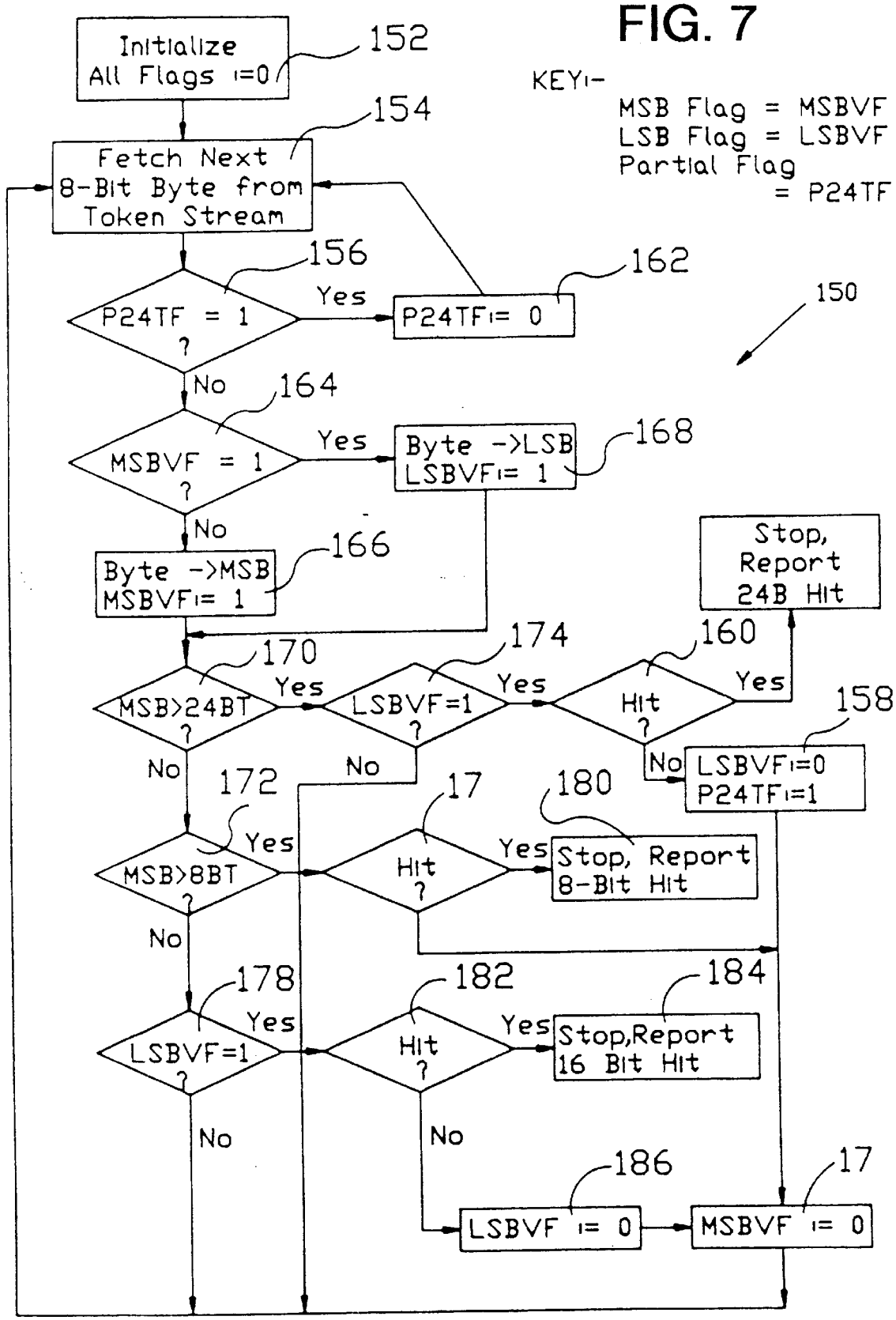

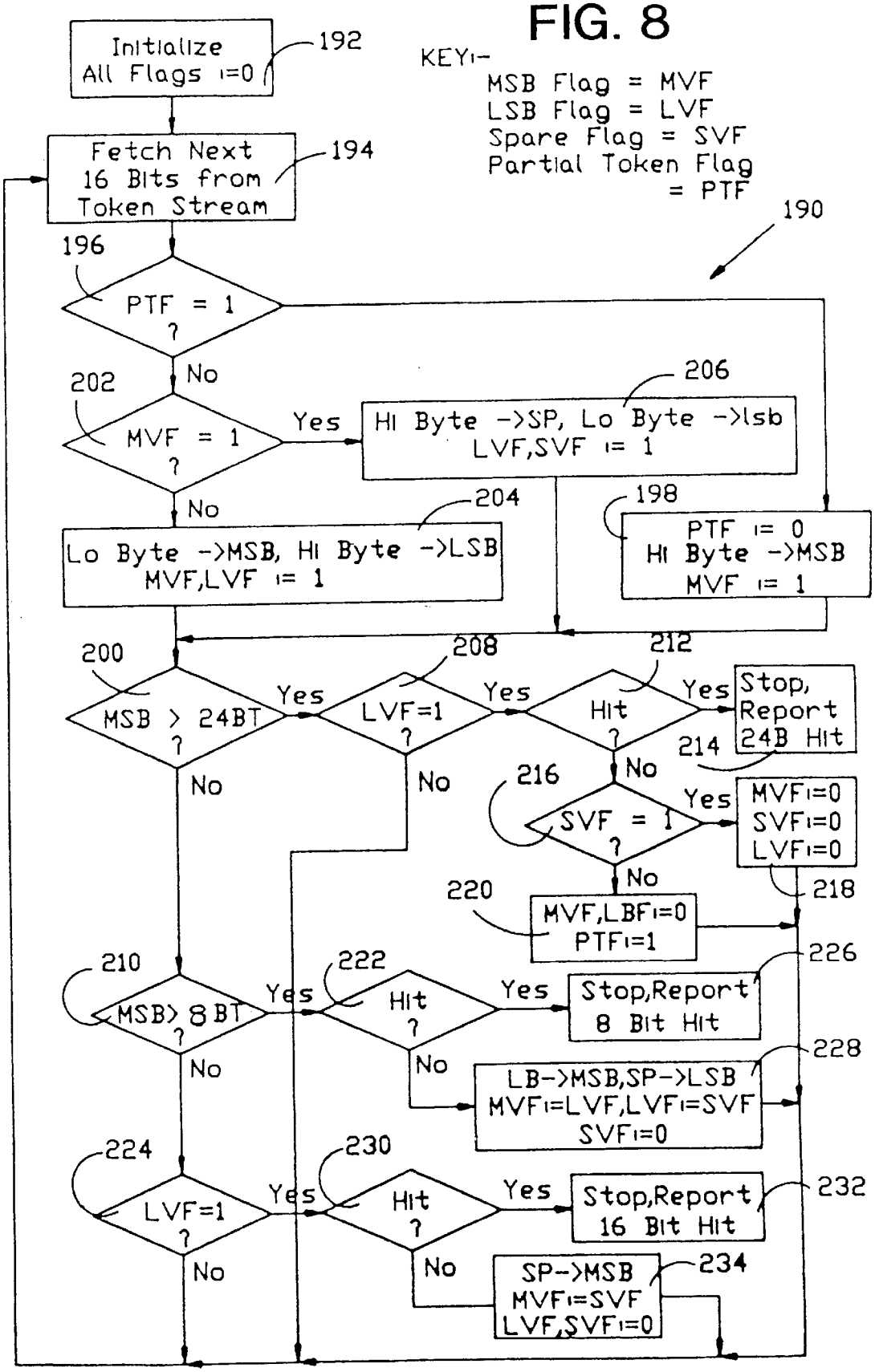

SEARCH METHOD AND CIRCUIT

The present invention relates to a method of searching and a search circuit. The invention is particularly, but not exclusively, useful for searching text which has been compressed according to the method described in International Publication No WO 88/09586.

The method of the present invention is used for searching a token stream for at least one predetermined token. A token, in the context of this specification, is a binary code representation of a character, word or phrase. The character may be an alphanumeric character or a control character, such as carriage return or end of line, or a symbol, which is recognisable by a computer. A word may be a word as defined in International Publication WO 88/09586, and a phrase may include two or more words. A token stream is a sequence of tokens, which may represent a text, such as the Bible or a dictionary.

If one wishes to search for a particular word in a text which has been compressed, according to the method of International Publication WO 88/09586, it is not sufficient to merely search for the token representative of the word because the word may form part of a number of phrases which are represented by corresponding phrase tokens in the compressed text. In searching for a word in a token stream, the corresponding word token must be searched for, together with a number of phrase tokens which represent phrases that include the word. If N is the number of tokens which need to searched for for any given word, then in performing a normal access and compare search, each token access from the token stream as it is read needs to be compared with N tokens, which would require N comparators. Depending on the text which the token stream represents, N can be very large and therefore a searching method and circuit is required which enables a large number of comparisons to be performed at once, without using excessive circuitry.

In accordance with the present invention there is provided a method of searching a token stream for at least one predetermined token, comprising:

reading said token stream and forming an access address using an accessed token read from said stream; and reading memory means with said access address, said memory means having hit data stored therein at a location corresponding to said predetermined token; and repeating said reading steps until said hit data is read indicating said predetermined token has been found in said stream.

Preferably said access address includes said accessed token or a part thereof.

Preferably said hit data is a single bit, which is the complement of other data stored in said memory means.

Preferably said method further comprises recording the location of said accessed token in said token stream when said hit data is read, said location corresponding to a location of said predetermined token in said token stream. Preferably the reading steps are then interrupted to enable a display operation to be performed.

Preferably the method involves searching for a plurality of predetermined tokens and thus storing a plurality of hit data at locations corresponding to said predetermined tokens, respectively.

In accordance with the present invention there is also provided a search circuit for use in searching a token stream for at least one predetermined token comprising:

means for receiving an accessed token read from a token stream and forming an access address using said accessed token;

memory means, in use, having hit data stored therein at a location corresponding to a predetermined token;

means for reading said memory means with said access address; and means for generating a predetermined token found signal when said hit data is read.

Preferably said access address includes said accessed token or a part thereof.

Preferably said hit data is a single bit which is the complement of other data stored, in use, in said memory means.

Preferably said search circuit includes input alignment means for ensuring tokens are accessed correctly when tokens in the stream have different bit lengths.

Preferably said memory, in use, has a plurality of hit data stored therein at locations corresponding to a plurality of respective predetermined tokens.

Preferably said search circuit further includes means for accessing and reading said token stream.

Preferred embodiments of the present invention will now be described, by way of example only, with reference to the accompanying drawings wherein:

FIG. 7 is a flow diagram of a third preferred embodiment of a search method;

FIG. 8 is a flow diagram of a fourth preferred embodiment of a search method;

Figure 1:
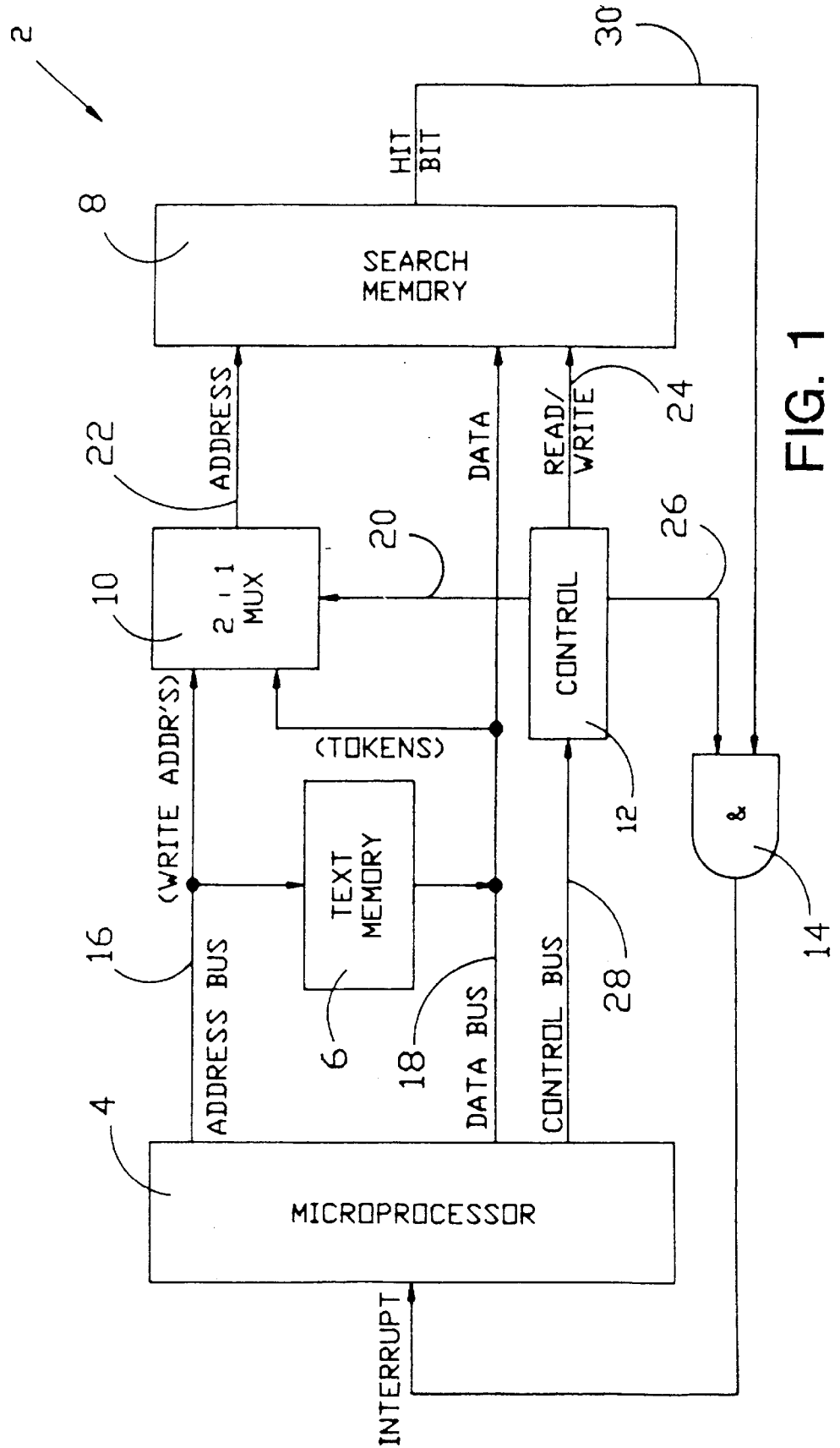
FIG. 1 is a block diagram of a first preferred embodiment of a search circuit.

A first search circuit 2, as shown in FIG. 1, is configured to search a token stream having tokens all of the same bit length and includes a microprocessor 4, a text memory 6, a search memory 8, a 2:1 multiplexer 10, a control circuit 12, and an AND gate 14. The tokens are chosen to be 16 bits long and the address and data buses 16 and 18, respectively, of the microprocessor 4 are 16 bits wide. The databuses may also be 8 bits wide. The search memory 8 is a 64K word×1 bit RAM. The text memory 6 is used to store compressed text represented by a token stream. The multiplexer 10 has the address bus 16 and the data bus 18 connected as inputs thereto which are selected according to the state of a control line 20 provided by the control circuit 12. The output of the multiplexer 10 is the address bus 22 of the search memory 8. The control circuit also provides a read/write line 24 for the search memory 8 and an enable line 26 for the AND gate 14. The control circuit 12 receives instructions via a control bus 28 from the microprocessor 4.

Before beginning any search the search memory 8 is first zeroed by the microprocessor 4. This is achieved by writing low bits to each location in the search memory 8. Alternatively, a zero input may be provided on the RAM used for the search memory 8 and automatic zeroing can be achieved using this input. Once the search memory 8 is zeroed, prior to commencing a search high bits, or hit bits, are written to all of the address locations in the search memory 8 which correspond to the code of the tokens which are to be searched for or are of interest. The token stream in the text memory 6 is then accessed a token at a time, in sequence, by the microprocessor 4 and placed on the data bus 18 for input to the multiplexer 10. The multiplexer 10 is set so as to pass the accessed tokens as addresses to the search memory 8. The read/write line 24 is placed in a read state and the data line 30 of the search memory 8 is connected as an input to the AND gate 14. When a token of interest is accessed and passed to the search memory 8 as an address, a hit bit appears on the line 30 which causes a high signal to appear at the output of the AND gate 14 when the enable line 26 is set. The output of the gate 14 is connected to the interrupt input of the microprocessor 4 so the high signal causes the microprocessor 4 to cease accessing the token stream in the text memory 6, as a token of interest has been found. The microprocessor 4 retains the address location of the located token in the text memory and is able to decompress a portion of the token stream in which the token appears and display the corresponding part of the text.

The search circuit 2 enables a user to make a number of comparisons simultaneously for each token read without requiring an elaborate array of conventional comparator circuits.

Depending on the size of the text to be compressed, the bit length of tokens allocated to words, phrases and characters may vary. For example, normal words and phrases may be allocated 16 bit tokens, whereas words which occur frequently in the text may be allocated 8 bit tokens, which gives rise to savings in storage space, as discussed in International Publication WO 88/09586. When accessing a token stream which includes variable length tokens, the tokens should be accessed on token boundaries, defined by the beginning and end of the token and a determination should be made as to what type of token has been accessed. The determination step can be simplified by judicially selecting the form of the different length tokens. For instance, the 8 bit tokens may all have bytes which are greater in value than the most significant bytes of the 16 bit tokens so the two can be easily distinguished. Furthermore, the width of the address and data buses used in the search circuit may vary and this should also be taken into account.

Figure 2:
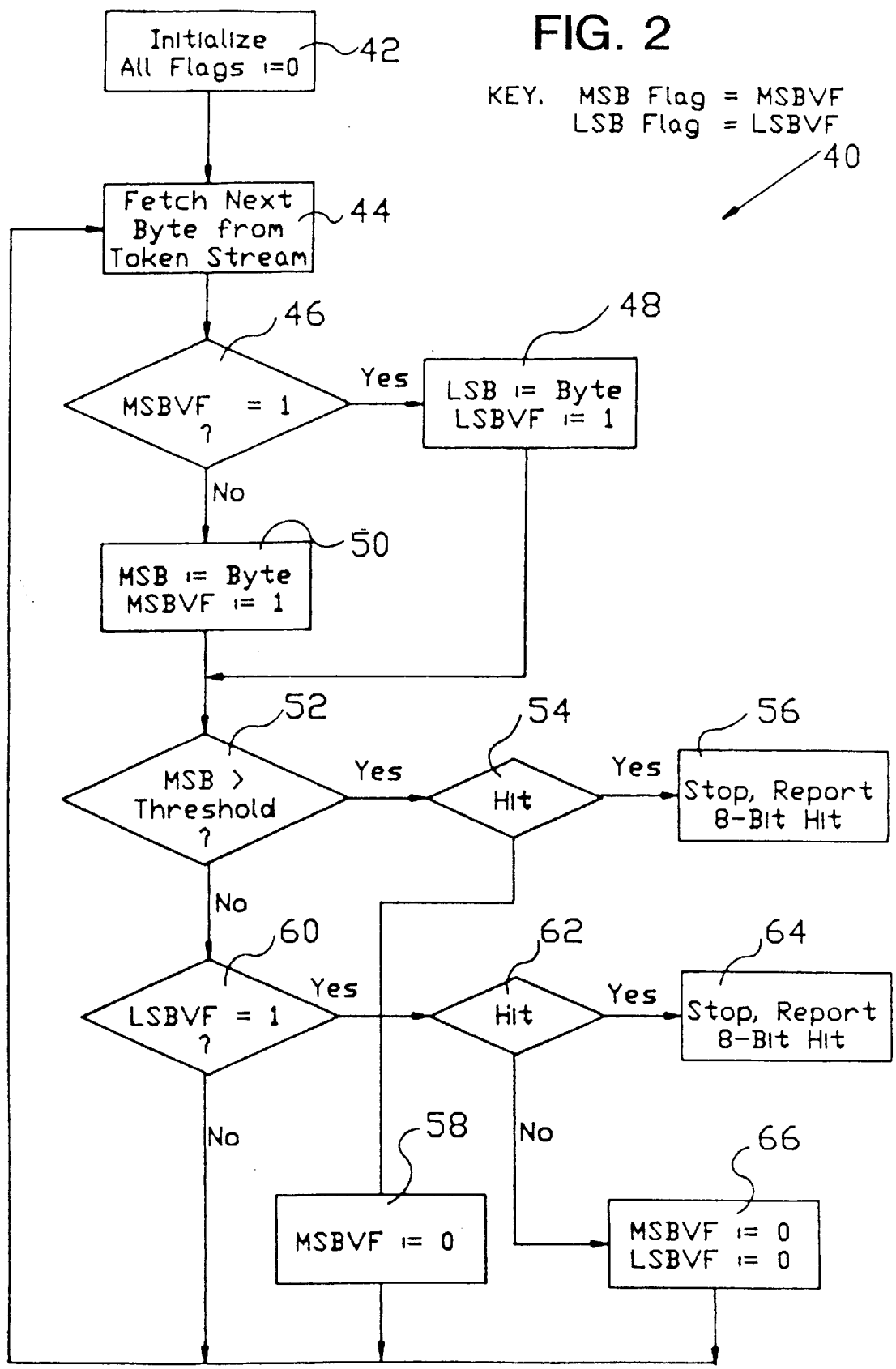
FIG. 2 is a flow diagram of a first preferred embodiment of a searching method.

A first routine 40, as shown in FIG. 2 is used to search a token stream having 8 and 16 bit tokens with a data bus which is 8 bits wide. The 8 bit tokens are all greater in value than the most significant byte of the largest 16 bit token. The routine 40 and all of the routines discussed hereinafter are executed either by a microprocessor 4 incorporated in a search circuit or a microprocessor connected to the search circuit.

The routine 40 requires the use of the most significant byte (MSB) and least significant byte (LSB) flags and threshold, MSB and LSB registers. Routine 40 begins at step 42 by resetting all of the flags. A byte is then accessed from the token stream at step 44 and a check is made at step 46 to determine if the MSB flag is set. This flag is only set if an MSB of a token has been accessed previously. Tokens are stored in the token stream so that when the stream is accessed from beginning to end sequentially, the MSBs of tokens are received before the LSBs. If the MSB flag has been set when step 46 is reached, an MSB has already been received and the accessed byte is stored in the LSB register and the LSB flag is set at step 48. Otherwise the access byte is stored in the MSB register and the MSB flag is set at step 50. When accessing an 8 bit token or the start of a 16 bit token, step 50 will be executed instead of step 48. At step 52 the contents of the MSB register is compared to the contents of the threshold register to determine if the former is greater than the latter. The threshold register contains the MSB of the 16 bit token with the highest value, i.e. the largest 16 bit token, thus if the byte stored in the MSB register is greater than that of the threshold register, the byte is an 8 bit token and the routine 40 proceeds to step 54 at which a determination is made as to whether the token is one of interest. This is done by applying the contents of the MSB register to the upper and lower bytes of the address bus 22 of the search RAM 8. A hit occurs if a hit bit is outputted by the search RAM 8. If a hit occurs the executing microprocessor is interrupted at step 56 and the hit bit reported, otherwise the MSB flag is reset at step 58 and operation of the routine 40 resumes at step 44.

If the contents of the MSB register is less than that of the threshold register, the MSB stored relates to a 16 bit token and operation of the routine 40 proceeds at step 60 where a check is made to determine if the LSB flag is set. If the LSB flag is not set, the LSB of the 16 bit token has not been received and the routine 40 proceeds to step 44 so as to fetch the LSB byte and proceed through step 48 back to step 60. The LSB flag is now set and operation proceeds to step 62 where a check is made to determine if a hit has occurred after applying the 16 bit token to the address bus 22 of the search RAM 8. If a hit occurs, the microprocessor is interrupted and the 16 bit hit reported at step 64 otherwise the MSB and LSB flags are reset at step 66 and operation resumes at step 54 so as to access the next byte from the token stream. On reporting a hit, the microprocessor may access a portion of the token stream which includes the previously accessed and processed token, and decompress and display the part of the text which corresponds to that portion.

Figure 3:
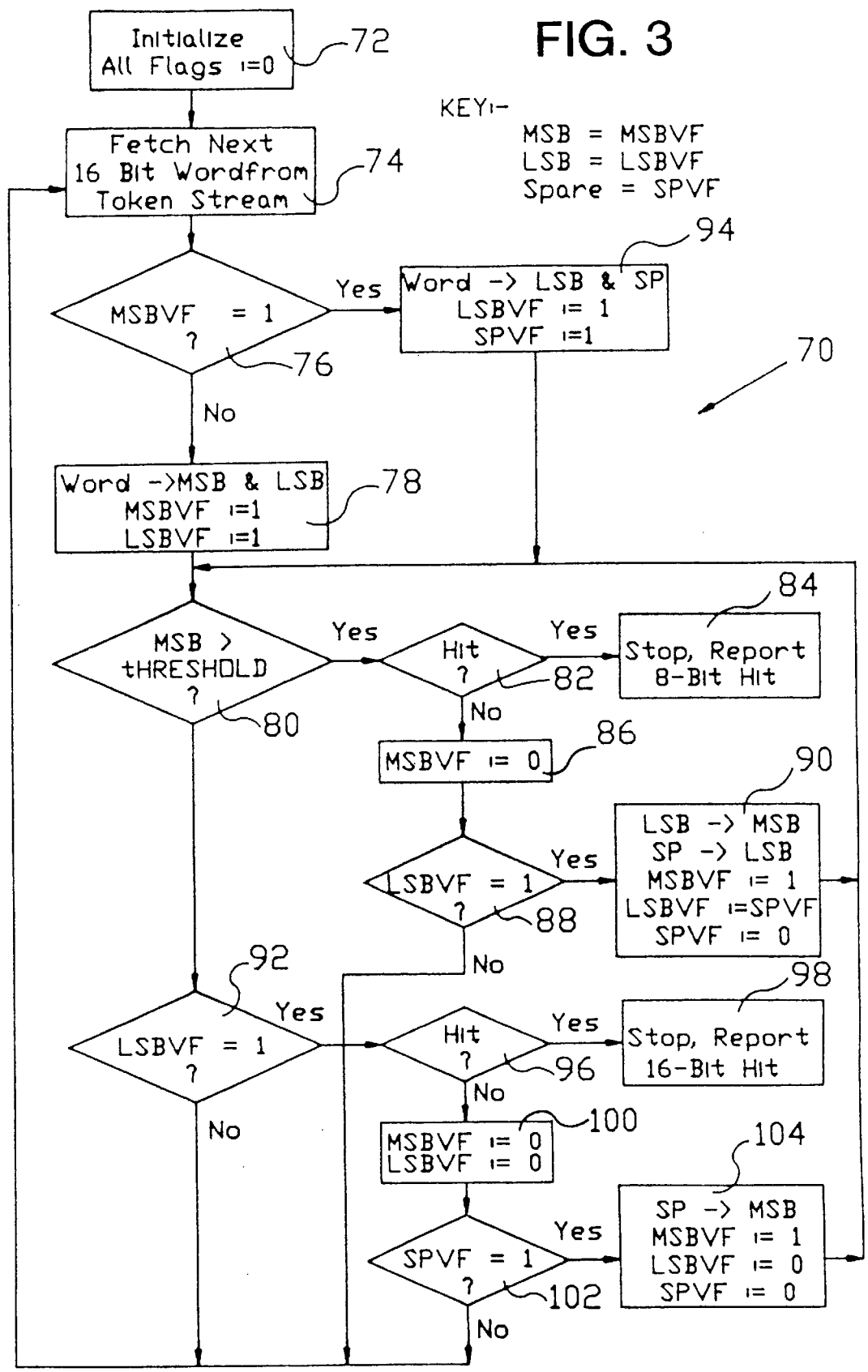
FIG. 3 is a flow diagram of a second preferred embodiment of a search method.

A second routine 70, as shown in FIG. 3, is used for searching a token stream having 8 and 16 bit tokens with a search circuit having a 16 bit data bus. The routine requires the use of four registers, a threshold register, an MSB register, an LSB register and a spare (SP) register. MSB, LSB and spare (SP) validity flags are also required.

The routine 70 begins at step 72 by resetting all of the flags. At step 74 the next two bytes in the token stream are accessed and the routine proceeds to step 76 at which a decision is made as to whether the MSB flag is set. Assuming the flag is not set, as would be the case for the first two bytes received, the two bytes are stored in the MSB and LSB registers consecutively and the MSB and LSB flags are set, at step 78. In the token stream the 16 bit tokens are stored with the MSB stored in the lower byte, which is accessed first in a forward token stream access, and the LSB is stored in the higher byte. Therefore the low byte goes to the MSB register and the high byte goes to the LSB register.

The contents of the MSB register is then compared with that of the threshold register to decide whether the former relates to an 8 bit token, at step 80, and if it does relate to an 8 bit token operation proceeds to step 82 where a decision is made as to whether the 8 bit token produces a hit, i.e. the token is of interest. If a hit is recorded the routine 70 is interrupted and the hit reported at step 84. If no hit occurs the MSB flag is reset at step 86 and a check is made at step 88 to determine if the LSB flag is set. For the present case, the LSB flag has been set by step 78 therefore the routine 70 proceeds to step 90 where the contents of the LSB register is placed in the MSB register, whatever is stored in the spare register is placed in the ISB register, the MSB flag is set, the LSB flag is set to be the same as the spare flag and the spare flag is reset. When any of the flags are set, this indicates that a token or a part thereof is stored in the register corresponding to the flag. After step 90 operation proceeds to step 80 to determine whether the contents of the MSB register relates to an 8 or 16 bit token.

After processing an 8 bit token to see if it will generate a hit, the state of the LSB flag at step 88 indicates whether the token is the first, or high byte, of the two bytes accessed at step 74 or the second, or low byte, of the two bytes. If the token is the first of the two bytes operation proceeds to step 90 where the second byte, which has been stored in the LSB register, is appropriately placed in the MSB register for further processing. The low byte could be another 8 bit token or the MSB of a 16 bit token. If the 8 bit token processed is the low byte then operation of the routine 70 must proceed from step 88 back to step 74 so that another two bytes can be accessed from the token stream.

If the contents of the MSB register relates to a 16 bit token operation passes from step 80 to step 92 when the state of the LSB flag is examined. If the flag is low the routine jumps to step 74 and another two bytes are accessed and as the MSB flag is set the low byte is placed in the LSB register and the high byte is placed in the spare register, and the corresponding flags are set accordingly, at step 94. The routine then proceeds back to step 92 as the LSB flag is now set indicating a 16 bit token is available for processing, the contents of the MSB and LSB registers are forwarded to the search memory as an address and a check made to see if a hit has occurred as a result, at step 96. If a hit occurs, the 16 bit hit is reported and operation of the routine 70 interrupted at step 98, otherwise the MSB and LSB flags are reset at step 100 and the state of the spare flag examined at step 102. If the spare flag is low the next two bytes are accessed at step 74 otherwise the contents of the spare register is placed in the MSB register and the MSB flag set accordingly whilst the remaining flags are reset, at step 104. After step 104, operation proceeds to step 80.

Figure 4:
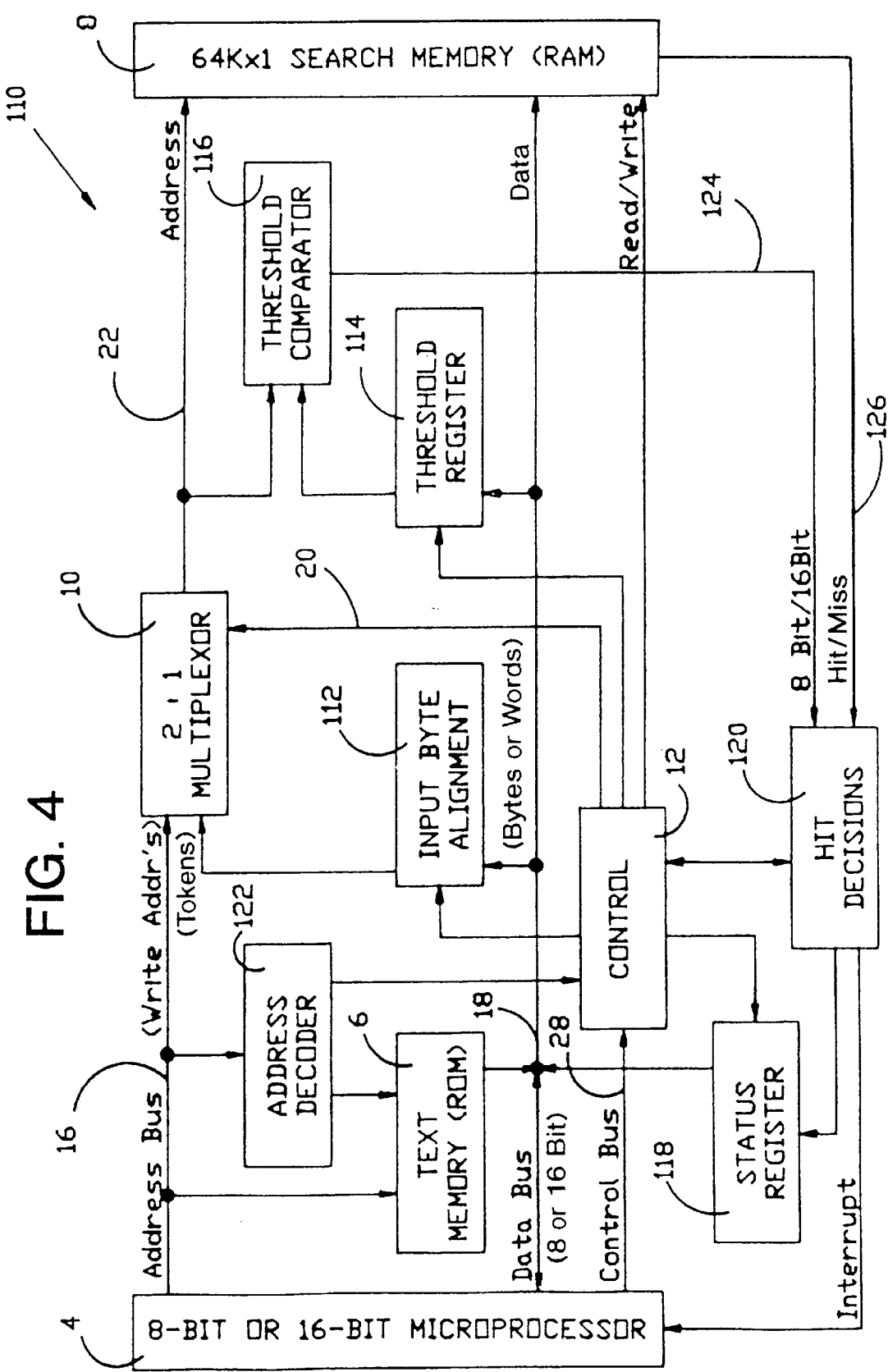
FIG. 4 is a block diagram of a second preferred embodiment of a search circuit.

A second search circuit 110, as shown in FIG. 4, is able to run the routines 40 and 70 and is the same as the first search circuit 2, except it further includes an input byte alignment circuit 112, a threshold circuit 114, a threshold comparator 116, a status register 118, and a bit decision circuit 120. An address decoder, which is required to selectively enable the text memory 6, or the control circuit 12 so as to receive data on the data bus 18 or the control bus 28, respectively, is also illustrated in FIG. 4. The data bus 18 may be 8 or 16 bits wide and the input byte alignment circuit 112 is connected to the data bus 18 so as to receive bytes therefrom. The output of the alignment circuit 112 is connected to the token input of the multiplexer 10 and is controlled by the control circuit 12. The alignment circuit includes the MSB, LSB and the spare registers, as required, which are configured in a shift register arrangement so that the contents of the spare register can be shifted into the LSB register and the contents of the LSB register can be shifted into the MSB register. The threshold register 114 is connected to the data bus 18 to receive and thereafter store therein the MSB of the largest 16 bit token. The threshold register 114 outputs its contents, in response to a signal received from the control circuit 12, to the threshold comparator 116, for comparison with the MSB of the 16 bit address bus 22 of the search memory 8. The result of the comparison is represented by the state of an 8 bit/16 bit line 124 outputted from the comparator 116 and inputted to the hit decision circuit 120. The state of the line 24 indicates whether the MSB on the address bus 22 relates to an 8 or 16 bit token. The bit of data read from the search RAM 8 in response to the address on the bus 22 is placed on a hit/miss line 126 which is also inputted to the hit decision circuit 120. The hit decision circuit provides an output to the status register 118 indicating whether an 8 or 16 bit token has been accessed and whether a hit or miss has occurred. The hit decision circuit 120 also provides a signal to interrupt the microprocessor 4 when a hit occurs. The status register 118 is set by the control circuit 12 and the hit decision circuit 120, and stores a number of control flags, including the MSB, LSB and spare flags as required. The state of the status register is placed on the data bus 18 for analysis by the microprocessor 4 in response to an appropriate control signal being inputted from the control circuit 12.

Figure 5:
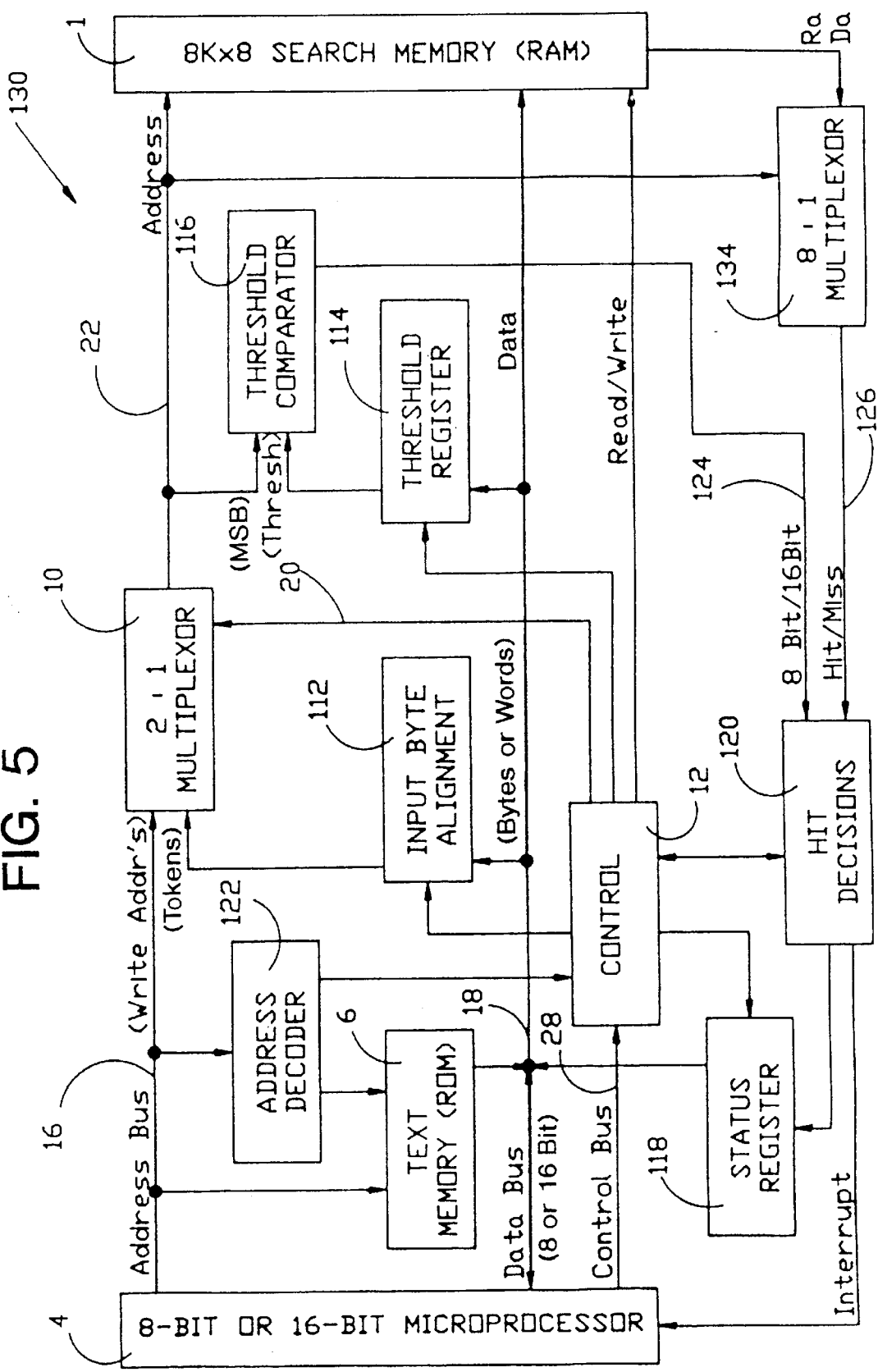
FIG. 5 is a block diagram of a third preferred embodiment of a search circuit.

A third search circuit 130, as shown in FIG. 5, is the same as the search circuit 110 of FIG. 4, however an 8k×8 search memory 132 is employed instead of the 64K×1 search memory 8 of the circuit 110. 64k×1 memories are, at present, relatively expensive and difficult to obtain. Also data can only be written to such memories one bit at a time and therefore zeroing all of the memory locations is a relatively time consuming process as 64k write cycles are required. 8k×8 memories are more readily available and only 8k write cycles are required to zero the memories. The 8 bit data bus of the search memory 132 is connected to the inputs of an 8:1 multiplexer 134 which is controlled by the most significant three bits of the search memory address bus 22 so as to select which one of the bits on the search memory data bus is placed on the hit/miss line 126. The remaining 13 bits of the address bus 22 are used to address the search memory 132.

Figure 6:
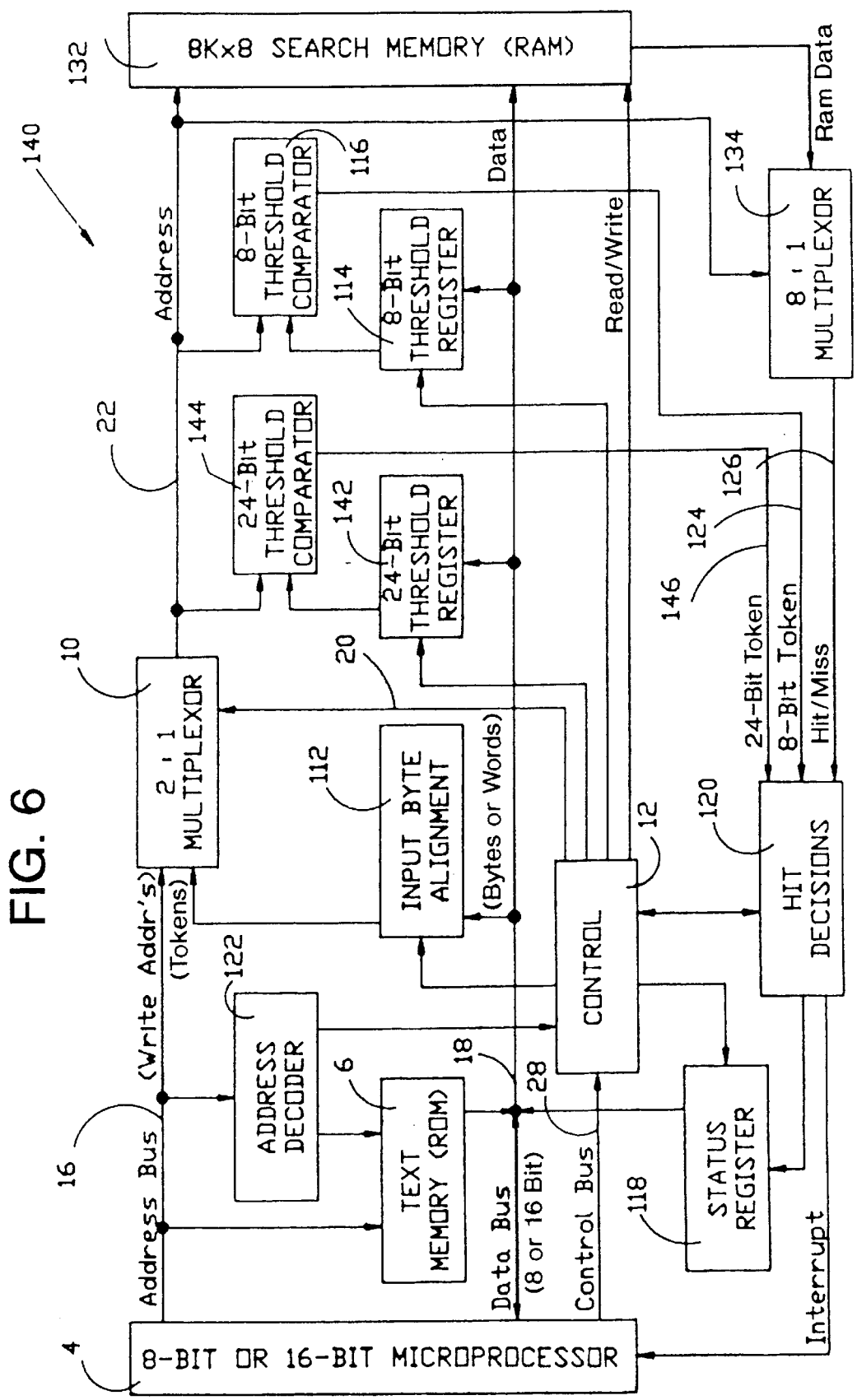
FIG. 6 is a block diagram of a fourth preferred embodiment of a search circuit.

A fourth search circuit 140, as shown in FIG. 6, is capable of processing a token stream which includes 8,16 and 24 bit tokens. Certain texts, such as that of a dictionary, may include a large vocabulary of words which cannot all be represented by 16 and 8 bit tokens within a corresponding 64k address space. This problem can be solved by allocating 24 bit tokens to the least frequently occuring words in the text, which may occur only once or twice. The 24 bit tokens are included within the 64k address space of the search memory 8, 132 by allocating 256 24 bit tokens to a single search memory address. If a hit is produced on accessing the search memory using a 24 bit token address the microprocessor 4 then performs a number of standard comparisons to determine which one of the corresponding 256 tokens is of interest.

The fourth search circuit 140 is similar to the second and third search circuits 110 and 130 described previously, but it further includes a 24 bit threshold (24BT) register 142 and comparator 144 in addition to the 8 bit threshold (8BT) register 114 and comparator 116. The most significant 16 bits of the 24 bit tokens are used to address the search memory 132 and control the multiplexer 134, and the MSB of all of the 24 bit tokens are chosen greater than the largest 8 bit token so the two types may be easily distinguished. Thus the 24 bit threshold register 142 is used to store the largest 8 bit token. The control and hit decision circuits 12 and 120 and the status register 180 are expanded to cater for 24 bit tokens. The hit decision circuit 120 receives the output generated by the 24 bit threshold comparator 144 on a 24 bit token line 146 and the status register 118 is required to store a further partial token flag, the use of which is described hereinafter.

A third routine 150, as illustrated in FIG. 7, is for processing 8,16 and 24 bit tokens using the fourth search circuit 140 when it includes an 8 bit data bus. The routine 150 begins at step 152 by initialising all of the flags, which include the MSB and LSB flags and the partial token flag. Next, at step 154 a byte is accessed from the stored token stream and at step 156 the state of the partial token flag is checked. The partial token flag is only set at step 158 after the most significant 16 bits of a 24 bit token have been accessed and forwarded to the search memory for a hit decision at step 160 and no hit has occurred. Setting the partial token flag provides an indication that the next byte to be accessed from the token stream is the LSB of a 24 bit token and is to be disregarded and another byte accessed. Thus at step 156 if the partial token flag is set it is reset at step 162 and operation of the routine 150 proceeds to step 154.

The remainder of routine 150 is similar to the first routine 40 described previously. If the partial token flag is not set the MSB flag is examined at step 164. If the MSB flag is not set the accessed byte is placed in the MSB register and the MSB flag is set at step 166 otherwise the byte is placed in the LSB register and the LSB flag is set at step 168. Next a determination is made at step 170 to see if the contents of the MSB register is greater than the contents of the 24 bit threshold register 142. If it isn't operation proceeds to step 172, otherwise if it is, the contents of the MSB register relates to a 24 bit token and at step 174 the LSB flag is examined to determine whether a middle byte of the token has been accessed or not. If the middle byte hasn't been accessed operation returns to step 154 to access the byte, otherwise the MSB and the middle byte are submitted to the search memory and a check is made at step 160 to see if a hit has occurred. If a hit occurs it is reported and the process interrupted at step 176. Otherwise at steps 158 and 179 the LSB and MSB flags are reset and the partial token flag is set as described previously.

The contents of the MSB register is compared with the contents of the 8 bit threshold register 114 at step 172 and if it is greater than that of the threshold register the MSB stored in the register relates to an 8 bit token and operation proceeds to step 177 otherwise it relates to a 16 bit token and operation proceeds to step 178. The contents of the MSB register is placed on the MSB and LSB lines of the address bus 22 at step 177 and submitted to the search memory and a check made to see if it a hit has occurred. If a hit occurs it is reported as a 8 bit hit at step 180 and the processor interrupted, otherwise operation proceeds to step 179 and the next byte is accessed from the token stream at step 154. At step 178 the LSB flag is read and if it is not set the LSB of a 16 bit token is accessed at step 154 and if it is set a 16 bit token has been accessed and is submitted to the search memory to decide if it represents a hit at step 182. If a hit occurs it is reported as a 16 bit hit and the processor interrupted at step 184, and if a hit doesn't occur the LSB and MSB flags are reset at steps 186 and 179 before operation is returned to step 154.

A fourth routine 190, as shown in FIG. 8, is also capable of accessing and processing 8,16 and 24 bit tokens of a token stream and is for use in the fourth search circuit 140 when it has a 16 bit data bus. The routine begins at step 192 where all flags are reset and at step 194, 16 bits are accessed from the token stream. At step 196 the state of the partial token flag is checked and if the flag is set the two bytes accessed previously from the token stream were the most significant and middle bytes of a 24 bit token. Thus the low byte just accessed is ignored as it is the LSB of the 24 bit token, and the high byte just accessed is placed in the MSB register, the MSB flag set and the partial token flag reset at step 198. Operation then proceeds to step 200.

If the partial token flag is not set when examined at step 196 the MSB flag is checked at step 202 and if not set the low byte accessed from the token stream is placed in the MSB register and the high byte is placed in the LSB register, and the MSB and LSB flags set at step 204. Operation then proceeds to step 200. Otherwise if the MSB flag is set at step 202, indicating an MSB of a token has been obtained, the recently accessed low byte is placed in the LSB register and the high byte is placed in the spare (SP) register, with the LSB and spare flags being set, at step 206, and then operation proceeds to step 200.

At step 200 the contents of the MSB register is compared with the contents of the 24 bit threshold register to detemine if the former relates to a 24 bit token, and if it is does operation proceeds to step 208, otherwise operation proceeds to step 210. At step 208 the LSB flag is checked to determine if the middle byte of the 24 bit token has been obtained and if not operation proceeds to step 194, otherwise if it has been obtained the routine 190 proceeds to step 212 to see whether the 24 bit token produces a hit. If a hit occurs it is reported and the processor interrupted at step 214. If a hit doesn't occur the spare flag is checked at step 216 and if set this indicates the spare register contains the last byte of the 24 bit token so the spare flag is reset at step 218 to indicate that the contents of the spare register is to be disregarded, and the routine 190 continues at step 194. The MSB and LSB flags are also reset at step 218. If the spare flag is not set the MSB and LSB flags are reset, at step 220 and the partial token flag set, and then the routine 190 continues at step 194.

The contents of the MSB register, at step 210, is compared with the contents of the 8 bit threshold register to determine if the byte in the MSB register is an 8 bit token, and if it is operation proceeds to step 222, otherwise the routine 190 continues at step 224. At step 222, a check is made to determine if an 8 bit hit has occurred, and if so the hit is reported and the processor interrupted at step 226. if no hit occurs at step 228, the contents of the LSB register is shifted into the MSB register and contents of the spare register is shifted into the LSB register. Accordingly, the MSB flag is set to the state of the LSB flag, which is then set to the state of the spare flag and the spare flag is then reset. The routine 190 is then allowed to continue at step 194.

If operation proceeds to step 224, the contents of the MSB register relates to a 16 bit token, and at step 224 the ISB flag is examined to determined if the low byte of the token has been obtained, and if not operation proceeds to step 194. Otherwise if the low byte is present in the LSB register operation proceeds to step 230. At step 230 a check is made to determine if a hit has occurred after submitting the 16 bit token to the search memory and if a hit has occurred it is reported and the processor is interrupted at step 232. Otherwise if a hit doesn't occur the contents of the spare register is shifted into the MSB register, at step 234, and, accordingly, the MSB flag is set to the state of the spare flag and then the LSB and spare flags are reset. Operation of the routine 190 then continues at step 194.

The routines 150 and 190 described above ensure the token stream is accessed on token boundaries, notwithstanding the stream includes a mixture of 8,16 and 24 bit tokens.

There are a number of ways in which the token stream can be accessed and passed to a search circuit. A first method, as described previously, is for a processor to access the tokens one at a time and pass them to a search circuit. The tokens are therefore accessed and processed at processor speed, under software control. The method has a software equivalent in that it can be performed without specificaly adapted search circuits. This would involve allocating a 64k RAM memory space associated with a processor to act as a search memory. After zeroing the memory space and writing appropriate hit bits thereto a search can be carried out by using tokens to address the memory space and then examining the token stream at the last access address when a hit bit is read.

A second method involves using a direct memory access (DMA) controller of a personal computer, such as an IBM PC, to transfer tokens to a search circuit. The processor of the PC has access to the search memory to perform normal reads and writes, except when the DMA controller is transfering tokens to the search memory as addresses used to read the memory. The search memory is then placed in a search mode and the DMA controller is able to transfer tokens from the text memory as an input/output write. For this method the transfer of tokens takes place at the speed of the DMA controller, which is approximately ten times faster than transfering the tokens under software control.

A third method of delivering tokens to a search memory is to configure a dedicated DMA controller in the search circuit. A processor can then be used to initialise the search memory and then submit appropriate control instructions to enable a search to be initiated and continued until a hit occurs. The transfer of tokens then takes place at memory speed and the method is approximately three times faster than the second method discussed above.

A search circuit 300 which uses the second method of transfering tokens and performs the first routine 40, discussed previously, is illustrated in FIG. 9. The circuit 300 can be fabricated on a card for insertion in a IBM PC and includes two IBM PC connectors IBM 31A 302 and IBM 31B 304 for connecting the circuit 300 to the 20 bit address bus and 8 bit data bus of the IBM PC. The connectors 302 and 304 are also used to transmit and receive a number of control signals and timing signals, as well as providing voltage supply lines for the search circuit 300.

Figure 9A:
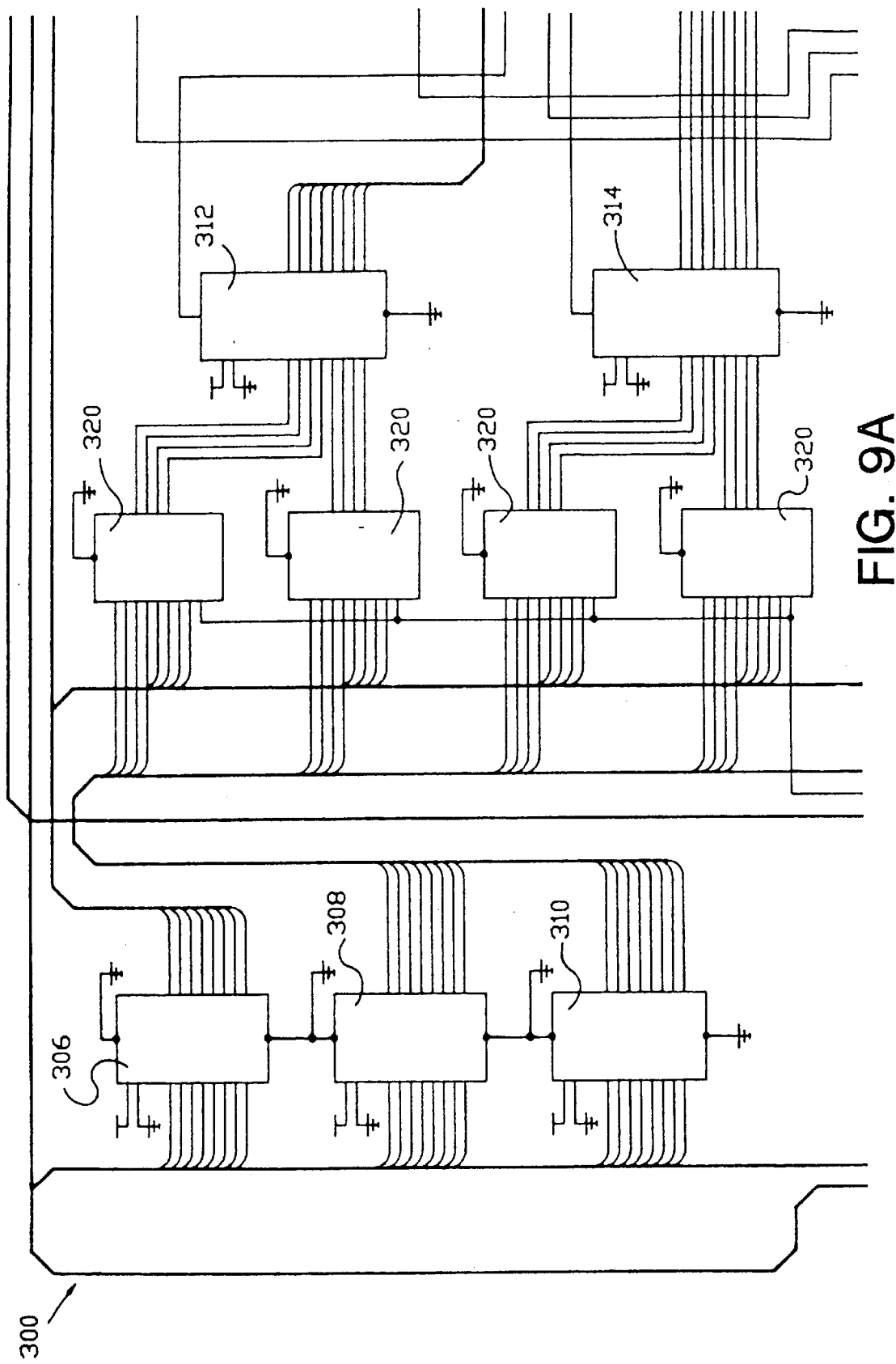
FIG. 9 is a circuit diagram of a fifth preferred embodiment of a search circuit, FIG. 9a being the top left part of the diagram, FIG. 9b being the top right part of the diagram, FIG. 9c being the bottom left part of the diagram, and FIG. 9d being the bottom right part of the diagram.
Figure 9B:
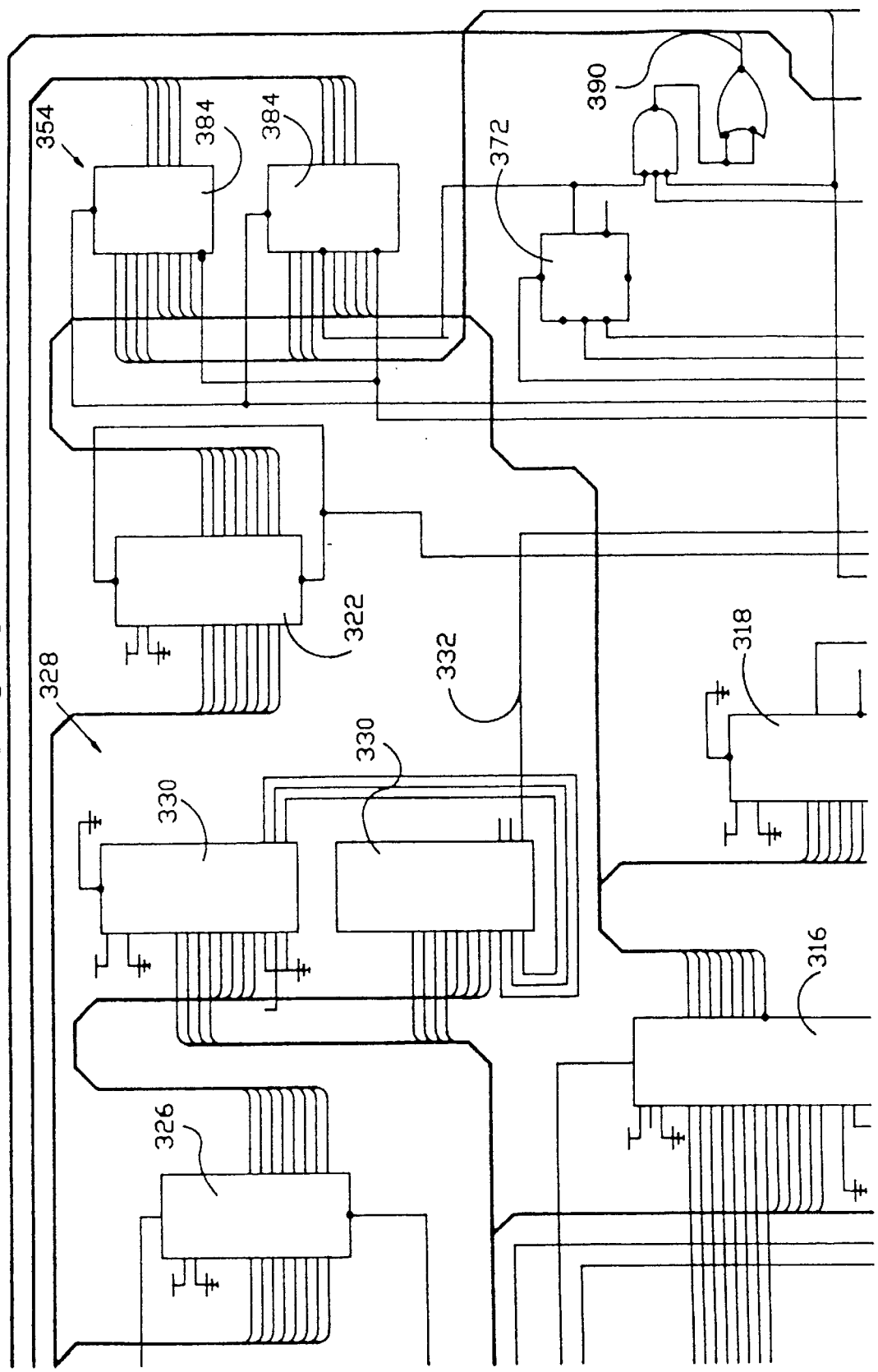

The circuit 300 includes an 8 bit data buffer 306 for receiving bytes transmitted on the data bus, and two address buffers 308 and 310, as shown in FIG. 9a, for receiving the least significant 16 bits of the address bus. The circuit 300 also has an 8 bit MSB register 312 and a LSB register 314 which are connected to an 8k×8 RAM 316 and an 8:1 multiplexer 318, as shown in FIG. 9b, to address a 64k search memory space. The inputs of the registers 312 and 314 are coupled to the data and address buffers 306, 308 and 310 by four 4 bit 2:1 multiplexers 320, which are selectively controlled so as to pass the contents of the lower address buffer 308 to the LSB register 314 and contents of the upper address buffer 310 to the MSB register 312, pass the contents of the data buffer 306 to both registers 312 and 314, or just pass the contents of the data buffer 306 to the LSB register 314. The parallel output of the LSB register 314 is connected to the least significant 8 bits of the address bus of the search memory 316 and the output of the MSB register 312 is connected to the remaining 5 bits of the address bus of the search memory with the 3 most significant bits of the output being connected to the multiplexer 318, so as to select a bit on the data bus of the search memory 316 which is inputted to the multiplexer 318.

The registers 312 and 314 store data received from the data buffer 306, when the circuit 300 is in a search mode, the data being an 8 bit token or part of a 16 bit token, and the contents of the registers 312 and 314 are used to read bits from the search memory 316 with the aid of the multiplexer 318. The registers 312 and 314 store the contents of the address buffers 308 and 310 when data is to be written to the search memory 316. Data to be written to the search memory 316 is passed from the data buffer 306 to a second data buffer 322, which then passes the data stored therein to the data bus 324 of the search memory 316 when the contents of the registers 312 and 314 is used to address the memory 316 for a data write.

The search circuit 300 includes, as shown in FIG. 9b, a threshold register 326 which is used to store the MSB of the largest 16 bit token. The register 326 receives the MSB from the PC via the data buffer 306 and the output lines of the register 326 are connected to inputs of an 8 bit threshold comparator 328 for comparison with the contents of the MSB register 312, the parallel outputs of which are also connected to the comparator 328:. The comparator 328 is configured from two 4 bit comparators 330. The output of the comparator 328 appears on an eight bit token line 332 which is high when the contents of the MSB register 312 relates to an 8 bit token and is low when the contents relates to the MSB of a 16 bit token.

Figure 9C:
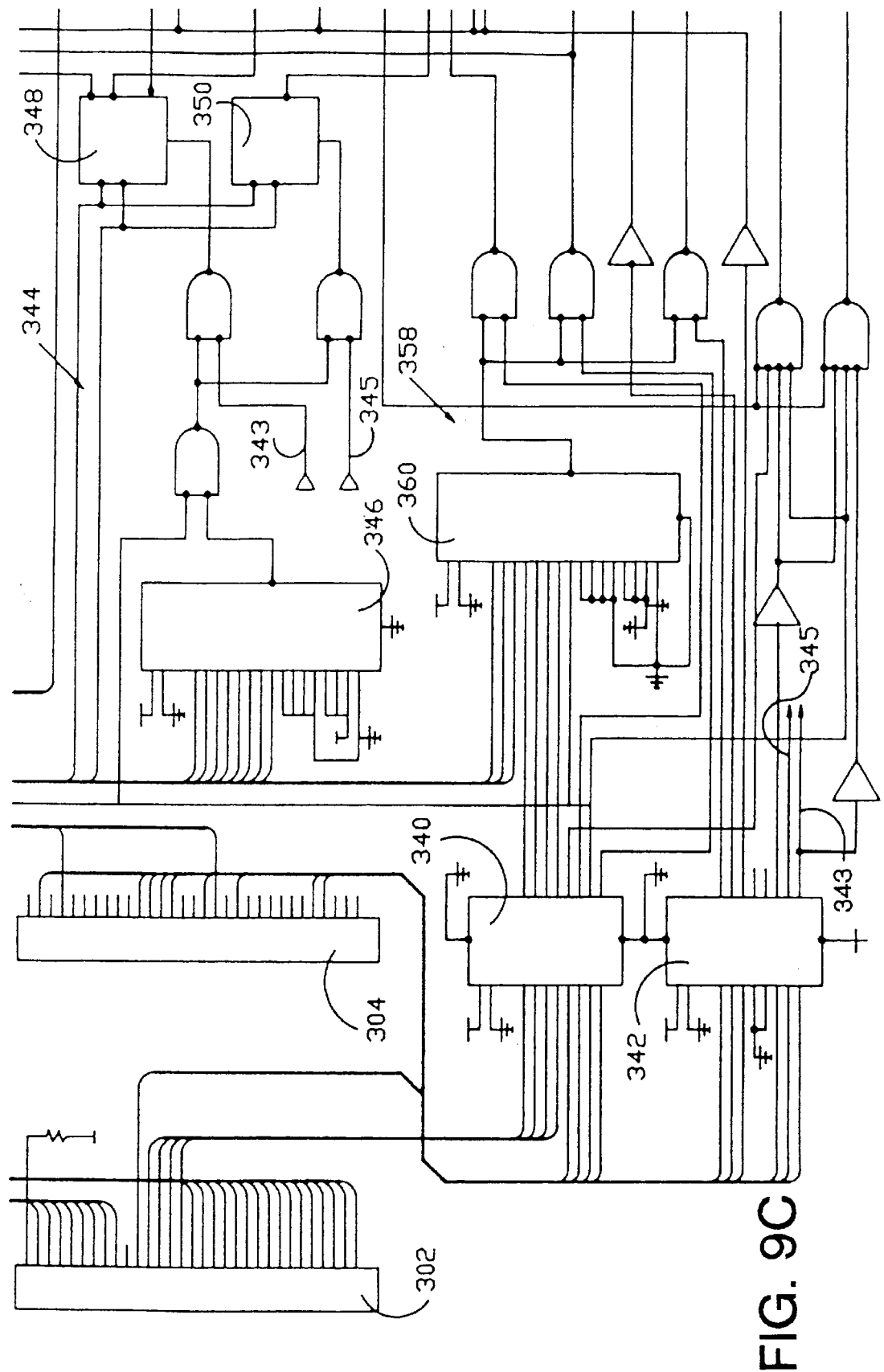

Control signals, such as terminal count (TC), address enable (AEN), and DMA acknowledge (DACK), received from the DMA controller of the PC are received by control buffers 340 and 342, as shown in FIG. 9c. The first control buffer 340 also receives the most signficant 4 bits of the PC address bus and the memory write and memory read (MEMW and MEMR) control signals. The second control buffer further receives the address latch enable (ALE), clock, reset and input/output write (IOW), and input/output read (IOR) signals from the IBM PC. The control signals received by the buffers 340 and 342, together with the state of the 20 bit address bus, the eight bit line 332 and the output of the 8:1 multiplexer 318, are used to control operation of the search circuit 300.

Figure 9D:
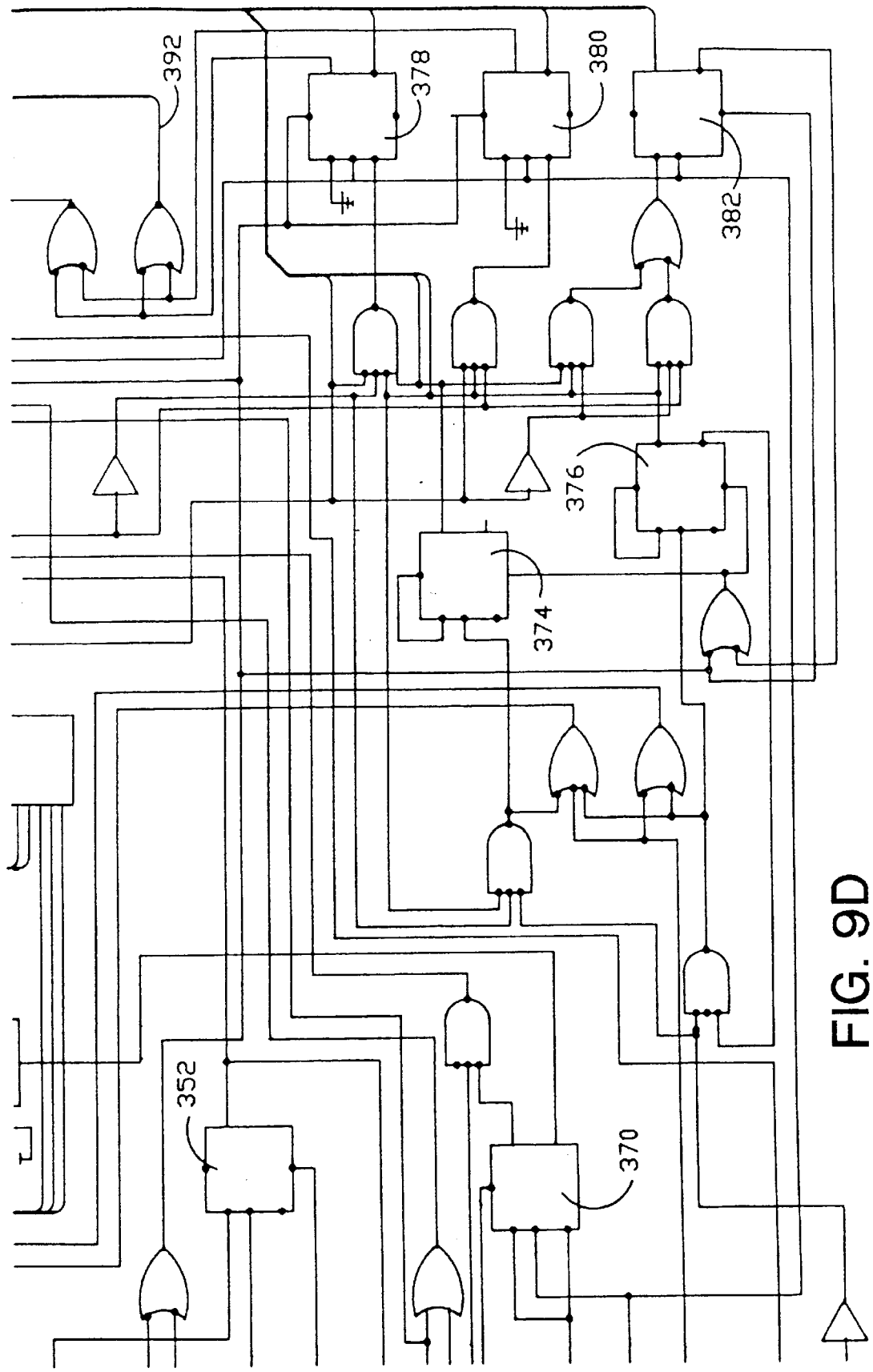
Figure 10:
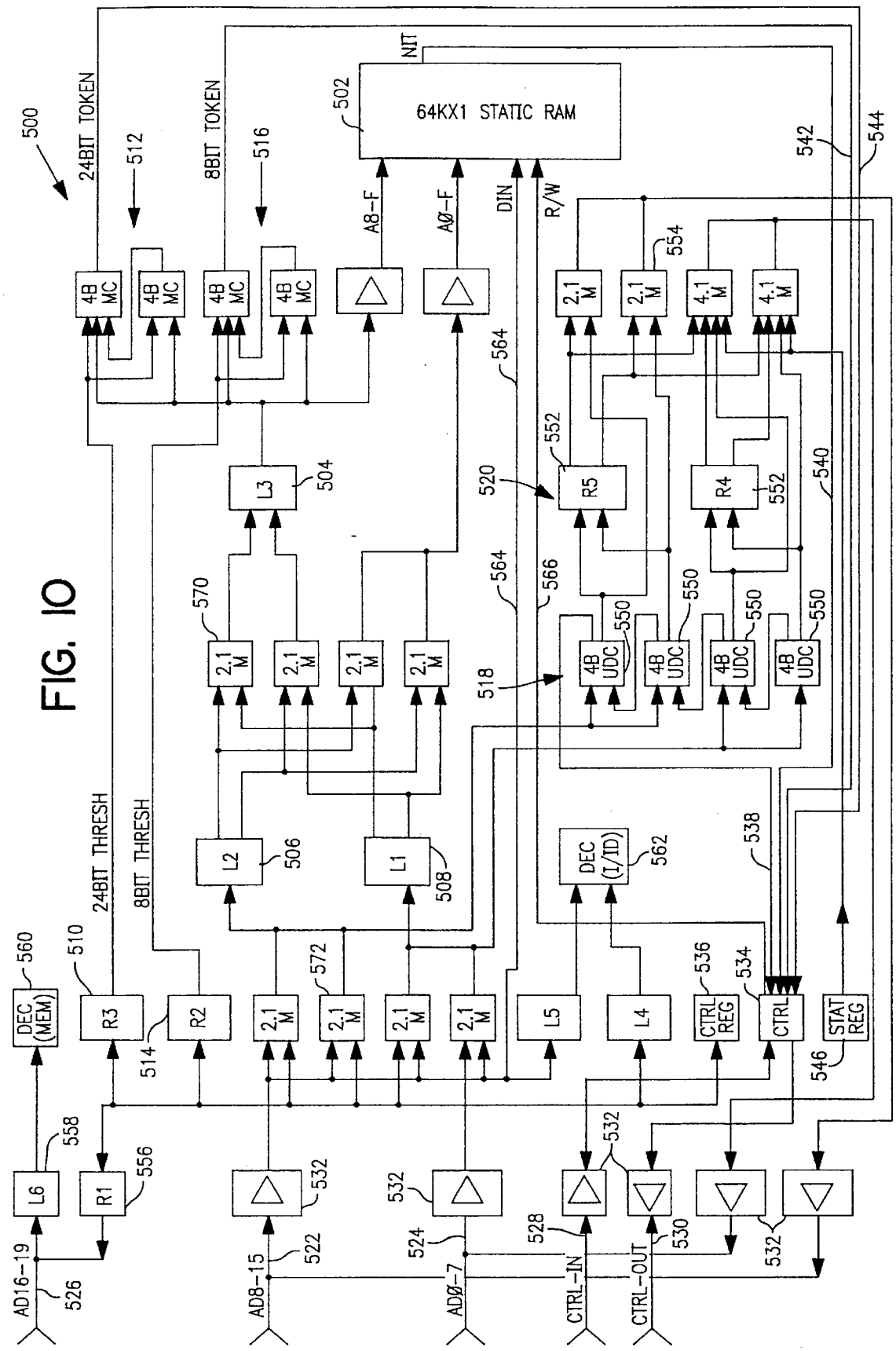
FIG. 10 is a block diagram of a sixth preferred embodiment of a search circuit.

In particular, an I/O decoder 344, as shown in FIG. 9c, includes an 8 bit equality comparator 346 and two 2 bit decoders 348 and 350. The I/O decoder 344 receives and is responsive to the ten least significant bits of the address bus and the control signals IOW and IOR to issue signals, when required, to:

1. Enable data to be written to the threshold register 326;
2. Set a search flip/flop 352, as shown in FIG. 9d;
3. Clear, or reset, all of the flip/flops of the circuit 300; or
4. Put the contents of the status multiplexer 354, as shown in FIG. 9b, on the PC data bus 356.

A memory cycle decoder 358 is also provided which comprises an 8 bit equality comparator 360 and is responsive to the most significant seven address lines of the address bus and the address enable signal to provide a signal which indicates when the PC is addressing the search memory 316 to perform a memory write or memory read.

Flip/flops provided in the search circuit 300 which are used to store control flags used in operation of the circuit 300 are the search flip/flop 352, a search memory output disable flip/flop 370, which is set when memory writes are performed, a terminal count found flip/flop 372, as shown in FIG. 9b, an LSB valid flip/flop 374, as shown in FIG. 9d, an MSB valid flip/flop 376, a 16 bit hit flip/flop 378, an 8 bit hit flip/flop 380 and a valid miss flip/flop 382. These flip/flops act as a status register, as described with reference to FIGS. 4 to 6. The search multiplexer 354, which comprises two 4 bit 2:1 multiplexers 384 is configured to receive and output the state of all of the status flip/flops described above and can also be selectively switched to output the state of the memory data bus 324 onto the PC data bus 356.

A search operation using the search circuit 300 is begun by issuing a reset signal on a reset control line of the PC which causes all of the control flip/flops to be reset. The PC then zeros the search memory space by writing 00 to all of the locations of the search memory 316. Hit bits are then written to the address locations of the search memory space corresponding to tokens of interest, i.e. the tokens which are to be searched for. For 8 bit tokens which are of interest the corresponding address location has a MSB and LSB which is the same as the token. For example, if it is desired to search for the 8 bit token CD, a hit bit is written to the memory space location CDCD by setting bit 6 at address location 0DCD of the search memory 316.

The MSB of the largest 16 bit token is then written to the threshold register 326. If the token stream does not include any 8 bit tokens FF can be written to the threshold register 326 to prevent the eight bit line 332 ever going high. Also if no 8 bit tokens are included in the token stream the threshold register 326 and the comparator 328 can be used to perform limited error checking. By storing the MSB of the largest 16 bit token in the register 326 and setting all of the search memory space locations corresponding to 16 bit tokens greater in value than that of the largest valid token then an 8 bit hit will occur whenever an invalid 16 bit token is supplied to the memory 316 and multiplexer 318, thereby indicating an error has occurred.

The PC is then used to set the DMA controller to access a 64k page of memory in the PC a byte at a time and transfer the bytes to the search circuit 300 as I/O writes. The 64k page includes the token stream to be searched.

The searching operation is begun by writing the value 1 to the I/O address 1C1 so as to set the search flip/flop 352 indicating the search circuit 300 has now been placed in a search mode. With the search flip/flops 352 set and the hit flip/flops 378 and 380 not set and the TC found flip/flop set, indicating a terminal count has not been found, a DMA request is made by placing a signal DRQ1 on line 390, as shown in FIG. 9b, which causes the DMA controller to begin transferring bytes of the 64k page to the search circuit 300. When a byte is transferred a DACK and IOW signals are provided and if these signals are present, the search flip/flop 352 is set, and the MSB flip/flop 376 is not set, then the transfered byte is placed in the MSB and LSB registers 312 and 314. Once a byte is stored in the MSB register 312 the eight bit line 332 is high or low in accordance with whether the stored byte relates to an 8 bit or a 16 bit token. If it relates to an 8 bit token and the output of the multiplexer 318 is high an 8 bit hit is recorded by setting the flip/flop 380, otherwise if the output of the multiplexer 318 is low a valid miss is recorded by setting the valid miss flip/flop 382. When the valid miss flip/flop has been set the MSB and LSB flip/flops 374 and 376 are cleared, or reset, on the next cycle of the clock input from the PC.

If the byte stored in the MSB register 312, however, relates to a 16 bit token then on the next memory access, with the MSB valid flip/flop 376 set, the access byte is passed only to the LSB register 314 and, accordingly, the LSB valid flip/flop is set. The contents of the registers 312 and 314 are used to access the search memory space and depending on the resultant state of the output the multiplexer 318 the 16 bit hit flip/flop 378 is set or the valid miss flip/flop 382 is set.

When either of the hit flip/flops 378 or 380 are set memory accesses by the DMA controller are stopped by resetting the DR01 line 390 and the PC is interrupted by sending an interrupt signal IRQ2 on line 392, as shown in FIG. 9b.

A terminal count signal (TC) is issued by the DMA controller when it is finished accessing the 64k page. When the search circuit 300 receives the terminal count signal together with the DACK and AEN signals and the search flip/flop 352 is set, the terminal count flip/flop 372 is reset. Whenever the TC signal is not present the flip/flop 372 remains set. If neither of the hit flip/flops 378 or 380 are set, the search flip/flop is set, and the terminal count flip/flop 372 is reset, then the DRQ1 line 390 is pulled low so as to halt the DMA controller and prevent it from accessing any further bytes. The size of the memory space to be accessed by the DMA controller can be set as desired by setting the terminal counter of the DMA controller to be one less than the size of the memory space.

A sixth search circuit 500, a shown in FIG. 9, is adapted to transfer tokens using the third token transfer method discussed previously and is able to search a token stream for predetermined tokens faster than any of the search circuits hereinbefore described. Preferably the circuit 500 is fabricated as a single integrated circuit. The circuit 500 is able to process 8, 16 and 24 bit tokens and is adapted for direct control by a microprocessor, such as the INTEL 80188 or 80186, having a 8 or 16 bit data bus.

The search circuit includes a 64k×1 search RAM 502, an MSB register 504, a high byte register 506, a low byte register 508, a 24 bit threshold register 510 and comparator 512, an 8 bit threshold register 514, and comparator 516, and an address counter 518 and a shadow register 520. The circuit 500 is adapted to receive 8 bit or 16 bit data and receive and transmit 16 bit addresses on an upper 8 bit address/data bus 522 and a lower 8 bit address/data bus 524, a 4 bit address bus 526 being provided for the most significant 4 bits of a 20 bit address transmitted to or received from a microprocessor connected to the circuit 500. The circuit also includes a control input bus 528 and a control output bus 530 for connection to a microprocessor and the 8 bit buses 522 and 524 and the control buses 528 and 530 are buffered by appropriate tri-state buffers 532. The control buses 528 and 530 are coupled to a control circuit 534 in the search circuit 500 which is also responsive to the state of a control register 536, a carry line 538 of the counter 518, the hit output line 540 of the search RAM 502, and 8 bit and 24 bit output lines 542 and 544, which are the outputs of the comparators 512 and 516. The control register 536 stores all of the control flags, such as the MSB and LSB flags, necessary for operation of the circuit 500. A status register 546 responsive to the control circuit 534 is also included and stores information on the state of operation of the circuit 500, such as whether an 8,16 or 24 bit hit has occurred or whether the circuit 500 is in a search mode.

The 16 bit address counter 518 is formed by four 4 bit up/down counters 550 and the shadow register 520, which comprises two 8 bit registers 552, is used to store an address outputted by the counter 518 while the counter 518 advances to the next address. Addresses stored in the shadow register 520 are used to access a token stream to be searched and are outputted by a first multiplexer array 554 to the address buses 522 and 524.

A page address register 556 is used to store four most significant bits of a 20 bit address which indicates which 64k page of a one megabit addressable memory space the circuit 500 is searching. The page address register 556 is written to by an I/O write in a similar manner as for the threshold registers 510 and 514. The four bits received on the address bus 526 are latched to a latch 558 and are passed to a memory decoder 560 which determines whether a memory space being addressed belongs to the search memory 502 or not. An input/output decoder responsive to, inter alia, addresses received on the high and low buses 522 and 524 determines whether one of the following I/O operations is to be enabled:

1. Read the contents of the status register 546
2. Write to one of the threshold registers 510 or 514

3. Read or write an address to the address counter 518
4. Write to the page address register 556
5. Write to the control register 536
6. Read the contents of the shadow register 520.

Operation of the circuit 500 is similar to that described previously for the PC compatible search circuit 300. Initially the search memory 502 is written to by supplying 16 bit addresses to the MSB and low byte registers 504 and 508 and one bit data, via a one bit data line 564, so as to zero the memory 502 and then write appropriate hit bits thereto. Reading or writing to the memory 502 depends on the state of a read/write line 566 supplied by the control circuit 534. Appropriate data is then written to all of the registers 510, 514, 556 and 536 and a starting address written to the address counter 518. As the counter 518 is configured using up/down counters 550, the counter 518 can be set to count forward or backward so the circuit 500 can search forward of backward through a token stream. A search is then begun by setting a search flag in the control register 536 to place the circuit 500 in a search mode and then for every memory cycle the shadow register 552 is read so as to supply addresses for accessing a token stream a byte at a time, or two bytes at a time, depending on the size of the data bus of the microprocessor connected to the circuit 500. The byte of an accessed token stream is always placed in the MSB register 504 so as to perform comparisons with the contents of the threshold registers 510 and 514. For 8 bit tokens the contents of the MSB register 504 would also appear in the high or low byte register 506 or 508 which supplied its stored byte to the MSB register 504 via a second multiplexer array 570, and the contents of both registers 504 and 506 or 508 is used to form a 16 bit address for accessing the search memory 502. The high and low registers 506 and 508 receive data from the high and low buses 522 and 544 via a third multiplexer array 572, and, in addition to storing and passing bytes to the MSB register 504, they act as the LSB and spare registers used in the third and fourth search routines 150 and 190 described previously. For 16 and 24 bit tokens the MSB is supplied to the search memory 502 as part of an address directly from the MSB register 504 and another byte of the token is supplied as the remainder of the address from either the low byte register 508 or the high byte register 506, depending on the contents stored therein as indicated by the state of corresponding control flags stored in the control register 536. The multiplexer arrays 554, 570 and 572 are switched by signals provided by the control circuit 534, signals lines of which are not shown.

I claim:

1. A method of searching a token stream for at least one predetermined token, comprising the steps of:

reading said token stream and creating an access address based on an accessed token read from said stream;

reading a memory means with said access address, said memory means having hit data stored therein at, at least, one address determined on the basis of said predetermined token; and repeating the steps of reading said token stream and said memory means at least until said hit data is read indicating said predetermined token has been found in said stream.

2. A method as claimed in claim 1, wherein said access address includes said accessed token or a part thereof.

3. A method as claimed in claim 1, wherein said hit data comprises a single bit which is the complement of other data stored in said memory means.

4. A method as claimed in claim 1, 2 or 3, further including recording the location of said accessed token in said token stream when said hit data is read, said location corresponding to a location of said predetermined token in said token stream.

5. A method as claimed in claim 4, further including interrupting said reading steps and enabling a display operation to be performed when said hit data is read.

6. A method as claimed in claim 4, wherein said stream includes tokens of different bit lengths and tokens are accessed according to token boundaries.

7. A method as claimed in claim 6, wherein reading said hit data in response to accessing a token of m bits, m being an integer greater than the length of said access address, indicates one of a plurality of m-bit tokens is located at the location of said accessed token and further comparative searching is performed to determine if said accessed token corresponds to said predetermined token.

8. A method as claimed in claim 7, wherein corresponding most significant portions of tokens of different lengths fall within respective ranges and the length of the accessed token is determined during said reading steps by comparing a most significant portion of the accessed token with at least one predetermined threshold.

9. A method as claimed in claim 1, wherein said method involves searching for a plurality of predetermined tokens, said method further including storing a plurality of said hit data in said memory means at addresses determined on the basis of said predetermined tokens, respectively.

10. A search circuit for use in searching a token stream for at least one predetermined token, comprising:

means for receiving an accessed token read from a token stream and creating an access address based on said accessed token;

memory means in use, having hit data stored thereon at, at least, one address determined on the basis of said predetermined token;

means for reading said memory means with said access address; and means for generating a predetermined token found signal when said hit data is read.

11. A search circuit as claimed in claim 10, wherein said access address includes said accessed token or a part thereof.

12. A search circuit as claimed in claim 10, wherein said hit data comprises a single bit which is the complement of other data stored in said memory means.

13. A search circuit as claimed in claim 10, 11 or 12, wherein said generating means causes the location of said accessed token in said token stream to be retained, said location corresponding to a location of said predetermined token in said token stream.

14. A search circuit as claimed in claim 13, wherein said predetermined token found signal is an interrupt signal.

15. A search circuit as claimed in claim 13, including input alignment means for ensuring the tokens are accessed and used to form said access address according to token boundaries when said token stream includes tokens of different bit lengths.

16. A search circuit as claimed in claim 15, wherein said input alignment means includes a plurality of registers for selectively storing said accessed token or least significant or most significant portions thereof in response to the state of a status means which indicates the registers which include valid data.

17. A search circuit as claimed in claim 16, wherein most significant portions of tokens of different lengths fall within different respective ranges, and said circuit includes means for storing and comparing at least one predetermined threshold with the most significant portion of the accessed token to generate a length signal representative of the length of said token.

18. A search circuit as claimed in claim 17, wherein the state of said status means and said length signal determines whether the token stream is to be read further to access a token and in which one of said registers the data read is to be stored.

19. A search circuit as claimed in claim 18, wherein said accessed token has a length m greater than said access address, said receiving and forming means applies part of the accessed token to said memory means and hit data read in response thereto indicates one of a plurality of m bit tokens is located at the location of said accessed token and further comparative searching is required to determine if said accessed token corresponds to said predetermined token.

20. A search circuit as claimed in claim 10, further including means for accessing and reading said token stream.

21. A search circuit as claimed in claim 10 wherein said memory means includes, in use, a plurality of hit data stored therein at addresses determined on the basis of a plurality of said predetermined tokens, respectively.

22. A method as claimed in claim 2, wherein said accessed token is used as said access address.

23. A search circuit as claimed in claim 10, wherein said accessed token is used as said access address.

* * * * *